(12) United States Patent
Choi

(10) Patent No.: US 7,190,700 B2
(45) Date of Patent: Mar. 13, 2007

(54) METHOD FOR MANAGING RADIO RESOURCE IN MOBILE COMMUNICATION SYSTEM

(75) Inventor: Sang-Yoon Choi, Suwon-si (KR)

(73) Assignee: LG-Nortel Co., Ltd., Seoul (KR)

( * ) Notice: Subject to any disclaimer, the term of this patent is extended or adjusted under 35 U.S.C. 154(b) by 1045 days.

(21) Appl. No.: 10/195,444

(22) Filed: Jul. 16, 2002

(65) Prior Publication Data

US 2003/0031201 A1    Feb. 13, 2003

(30) Foreign Application Priority Data

Aug. 8, 2001    (KR) .................... 2001-47608

(51) Int. Cl.
| H04J 3/16 | (2006.01) |
| H04J 3/22 | (2006.01) |
| H04J 1/16 | (2006.01) |
| H04J 3/14 | (2006.01) |
| H04J 3/18 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ............... 370/468; 370/230; 370/252; 370/395.21; 370/477

(58) Field of Classification Search ............ 370/328, 370/329, 333, 336, 347, 442, 477, 252
See application file for complete search history.

(56) References Cited

U.S. PATENT DOCUMENTS

| 5,448,750 | A | * | 9/1995 | Eriksson et al. ........ 455/452.2 |
| 5,533,024 | A | * | 7/1996 | Owada ....................... 370/347 |
| 5,784,365 | A | * | 7/1998 | Ikeda ........................ 370/337 |
| 5,923,650 | A | * | 7/1999 | Chen et al. ................ 370/331 |
| 5,940,763 | A | * | 8/1999 | Alperovich et al. ........ 455/450 |
| 6,064,678 | A | | 5/2000 | Sindhushayana et al. |
| 6,069,882 | A | * | 5/2000 | Zellner et al. ............. 370/329 |
| 6,097,733 | A | * | 8/2000 | Basu et al. ................ 370/468 |
| 6,201,971 | B1 | * | 3/2001 | Purnadi et al. ............ 455/450 |
| 6,226,227 | B1 | | 5/2001 | Lent et al. |
| 6,229,795 | B1 | | 5/2001 | Pankaj et al. |
| 6,836,666 | B2 | * | 12/2004 | Gopalakrishnan et al. ................... 455/452.2 |
| 6,898,195 | B1 | * | 5/2005 | Molno et al. .............. 370/329 |
| 6,931,023 | B2 | * | 8/2005 | Lin et al. .................. 370/458 |
| 2004/0203743 | A1 | * | 10/2004 | Macridis et al. ........... 455/427 |

\* cited by examiner

*Primary Examiner*—Huy D. Vu
*Assistant Examiner*—Blanche Wong
(74) *Attorney, Agent, or Firm*—Fleshner & Kim, LLP

(57) ABSTRACT

The present invention relates to a method for assigning a radio resource to a mobile station that requests a data service by collecting radio resources at a constant rate from mobile stations being served by a base station apparatus with a 1xEV-DO system. Especially, the present invention is appropriate for managing radio resources more efficiently and for improving the quality of service, by collecting part of the radio resource assigned to a mobile station having a lower service grade, among other mobile stations in service, assigning the collected radio resource to a mobile station that requested a data service, and providing the data service to the mobile station based on the assigned radio resource.

28 Claims, 3 Drawing Sheets

METHOD FOR MANAGING RADIO RESOURCE IN MOBILE COMMUNICATION SYSTEM

BACKGROUND OF THE INVENTION

1. Field of the Invention

The present invention relates to a method for assigning a radio resource to a mobile station by collecting a radio resource at a constant rate from another mobile station being served by a base station apparatus having a 1xEV-DO system.

2. Background of the Related Art

In general, an IS-95 based mobile communication system provides voice-centered services. Recently, however, thanks to the development of the 1xEV-DO wireless protocol, which is a forward link providing the maximum 2.4576 Mbps high speed packet data service, the mobile communication system is now able to provide multimedia services, such as IMT-2000 service as well as high speed packet data service, moving image service, and further packetized voice service.

The 1xEV-DO system is not focused on providing voice-centered services like IS-95. Rather, it is aiming to provide high speed packet data services only. Specifically, the data source of each mobile station varies depending on the wireless environment. The high speed data in a forward link is first loaded into a time slot that is segmented into 1.67 ms units and is transmitted through time division communication.

Therefore, to process high speed data traffic, the base station apparatus of the 1xEV-DO system needs to be able to increase the data transmission rate in a cell, based on resource capabilities, and to assign forward link resources to users at any time there is a data service request from a mobile station. Particularly, to maintain a designated frame error rate (hereinafter, abbreviated to FER), the base station apparatus sets a limit on the forward link capacity so that the forward link transmits data at a rate less than a maximum data processing capacity within a cell and performs scheduling through scheduling attempts using various types of appropriate methods.

FIG. 1 is a block diagram of a mobile communication system in a related art. Referring to FIG. 1, the mobile communication system manages a mobile station 11 and includes a base station 10, which provides data services. Mobile station 11 requests data services from base station 10 and receives the corresponding data services. Here, the base station manages a plurality of mobile stations 11a through 11c included in a cell.

Base station 10, in order to manage, utilize and assign available resources more efficiently, ranks the services according to the characteristics of a data call requested from mobile station 11a. That is, base station 10 ranks the priority of a mobile station and the service priority. If it turns out that the service grade given to mobile station 11a is higher than the service grade given to other existing mobile stations 11b and 11c that are already in service, base station 10 assigns a radio resource to mobile station 11a first, given that there are sufficient available resources. Based on the radio resources, base station 10 provides data services to the mobile station 11a.

However, if there are not enough available resources, base station 10 cannot assign proper radio resources, which means that it is not capable of providing a high speed packet data service according to the service grade given to mobile station 11a. As an alternative, base station 10 suspends the data service being provided to a mobile station having a lower service grade than mobile station 11a, such as 11b, among other existing mobile stations 11b and 11c in service, and provides the data service to mobile station 11a instead.

FIG. 2 is a flow chart explaining a method for managing a radio resource in a related art. With reference to FIG. 2, base station 10 receives a new data call from mobile station 11a (S21). Up to this point, mobile station 11a has no way to find out how much available resources are secured in a base station to which it has access.

If there is a data call from mobile station 11a, base station 10 confirms the priority of the mobile station and the priority of a data service (S23). Once the priorities of the mobile station and the data service are determined, base station 10 determines a service grade for mobile station 11a using the priorities (S25).

For example, when a data call from a mobile station is received, the base station first confirms the validity of the mobile station and decides a service priority for the mobile station referring to a database. Usually, the database has all the information about each mobile station. More specifically, information of a subscriber who pays an expensive information fee, information of a subscriber assigned to a particular VIP, information of a subscriber in an emergency situation, and so forth can be stored in the database. In addition, the priority of each different situation is decided in accordance with the standards set by the service providers.

If the data service requested by a mobile station belongs to a specific service designated by the service providers (e.g., a service with a high priority) or a requested data transmission rate of a mobile station is high relative to the system usage efficiency, the priority of the corresponding data service may be relatively high.

Base station 10 determines the presently available resource (S27) and decides whether the available resource could be assigned to mobile station 11a (S29). Here, the available resource means the number of time slots to be assigned to a mobile station in service.

If the presently available resource cannot be assigned to mobile station 11a, base station 10 checks the states of mobile stations 11b and 11c that are currently in service (S31). When the service grade of mobile station 11a turns out to be higher than the service grade of mobile stations 11b and 11c, base station 10 decides whether it is possible to suspend the data service to the mobile stations 11b and 11c that are in service (S33).

Afterwards, base station 10 transmits a suspension message to mobile station 11b (S35), given that the data service is suspendible for the station, and accepts the data service requested from mobile station 11a (S37). Later, base station 10 undertakes a service opening procedure and provides the data service to the mobile station 11a (S39).

If the suspension of the data service to mobile stations 11b and 11c that are in service seems to be impossible at step 33, base station 10 rejects the data service request from mobile station 11a (S41). On the other hand, if the available resource at present can be assigned to mobile station 11a in step 29, base station 10 can carry out the service opening procedure of step 39 directly.

In any case, where the presently available resource cannot be assigned to mobile station 11a in step 29, base station 10 either performs the data service at the available data transmission rate, which may be unsatisfactory to the service grade given to the mobile station, or provides the data service to mobile station 11a at the proper service grade rate after suspending the data transmissions of mobile stations 11b and 11c in service at that moment.

As described above, the 1xEV-DO mobile communication system generates more traffic volume than the traditional voice service-centered mobile communication system, which unfortunately causes problems like handoff and overload many times. Also, to provide prompt service in response to requests from the mobile station having a high service priority (e.g., high quality of service (QoS)), the 1xEV-DO mobile communication system should reserve more resources than the conventional voice service-centered base station.

In short, the base station with the 1xEV-DO system manages the resources to provide the data service requested from the existing mobile station within its cell. Also, the 1xEV-DO system performs the data service through a scheduling process that assigns a radio resource or a band based on the service characteristics of a call requested from the mobile station. Since the resources the base station may assign are limited, the designation of a call and the resource assignment for the quality of service are guaranteed within the limited resources. However, if the resources the base station could assign are not secured, the data service request from the mobile station with a higher service grade, than the data service grade of other mobile stations in service, cannot be met. As a consequence, the data service request from the mobile station with the higher service grade is turned down or the data service provided to the other mobile stations in service should be inevitably suspended to meet the data service request of the mobile station with the higher service grade.

Furthermore, some resources might be reserved in a base station by way of solving the above-described problems. But in such case, the entire system could be degraded.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is, therefore, an object of the present invention to provide a method for improving a quality of service and for managing a radio resource of a base station more effectively.

To achieve the above objects, the radio resources of a mobile station with a low service grade are collected and assigned to a mobile station with a high service grade.

To achieve the above objects, there is provided a method for managing a radio resource in a mobile communication system, including determining a service grade of a mobile station that requests a data service; collecting a radio resource, which is assigned to a mobile station corresponding to a lower service grade among other mobile stations in service, at a constant rate based on a radio resource required for the service grade; and assigning a radio resource to the mobile station using the collected radio resource.

The method may further include transmitting a response message for the data service request to the mobile station; providing a data service based on the assigned radio resource corresponding to the service grade assigned to the mobile station; reassigning radio resources of mobile stations in service based on the collected radio resource; reestablishing priorities in accordance with service grades of the mobiles stations in service; and providing data services to the mobile stations in service, in accordance with the reestablished priorities.

The collecting step may include confirming an available resource of a base station; deciding whether the available resource of the base station satisfies a radio resource required for the service grade; inquiring about the service grades of mobile stations in service, if the available resource does not satisfy the radio resource required for the service grade; and determining a collection rate of a radio resource, which is assigned to a lowest service grade among other service grades of the mobile stations in service.

The collection rate of the radio resource may be determined in accordance with a data transmission rate of a mobile station in service corresponding to a lowest service grade, the data transmission rate of the mobile station that requests the data service, a quality of service of the mobile station that requests the data service, or the quality of service of the mobile station corresponding to the lowest service grade.

In addition, the present invention provides a method for providing data services of a mobile communication system, including collecting a radio resource, at a constant rate, assigned to a mobile station corresponding to a lower service grade among other mobile stations in service at present, in case an available resource does not satisfy the request of a mobile station requesting a new data service; assigning a radio resource to the mobile station using the colleted radio resource; and providing the data service to the mobile station based on the assigned radio resource.

To achieve the objects in whole or in part, there is provided a method of allocating communication resources including collecting less than all of a first resource that is allocated to a first communication device, which is assigned a lower service priority than a service priority assigned to a second communication device; deallocating the collected first resource from the first communication device; and allocating the collected first resource to the second communication device.

To achieve the objects in whole or in part, there is provided a method of allocating a resource among a plurality of subscriber units including determining an amount of the resource required to meet a first prescribed condition; and apportioning the determined amount of the resource among the plurality of subscriber units according to a prioritization scheme, wherein each of the plurality of subscriber units is apportioned some of the resource.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
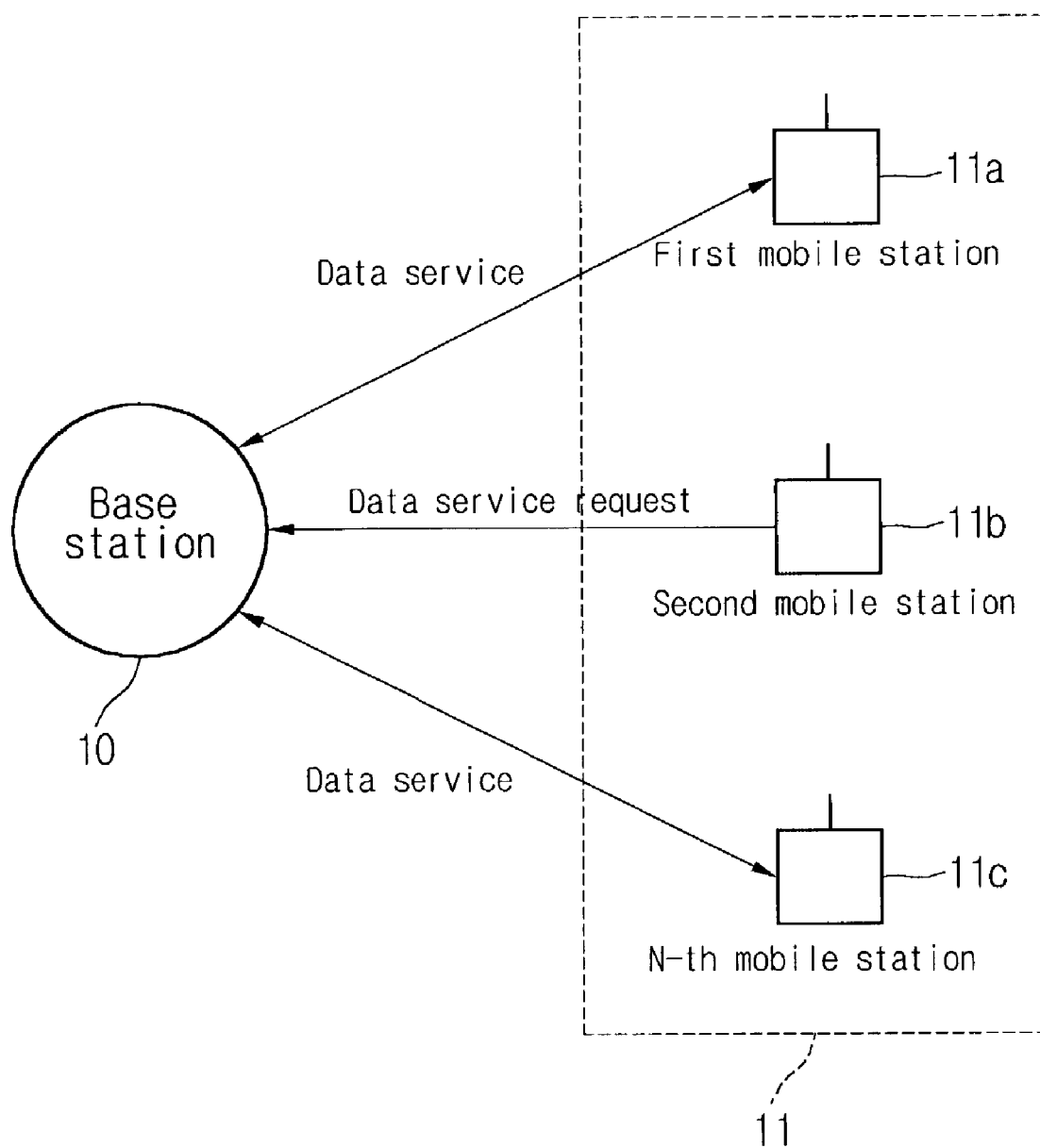
FIG. 1 illustrates a block diagram of a mobile communication system in the related art.
Figure 2:
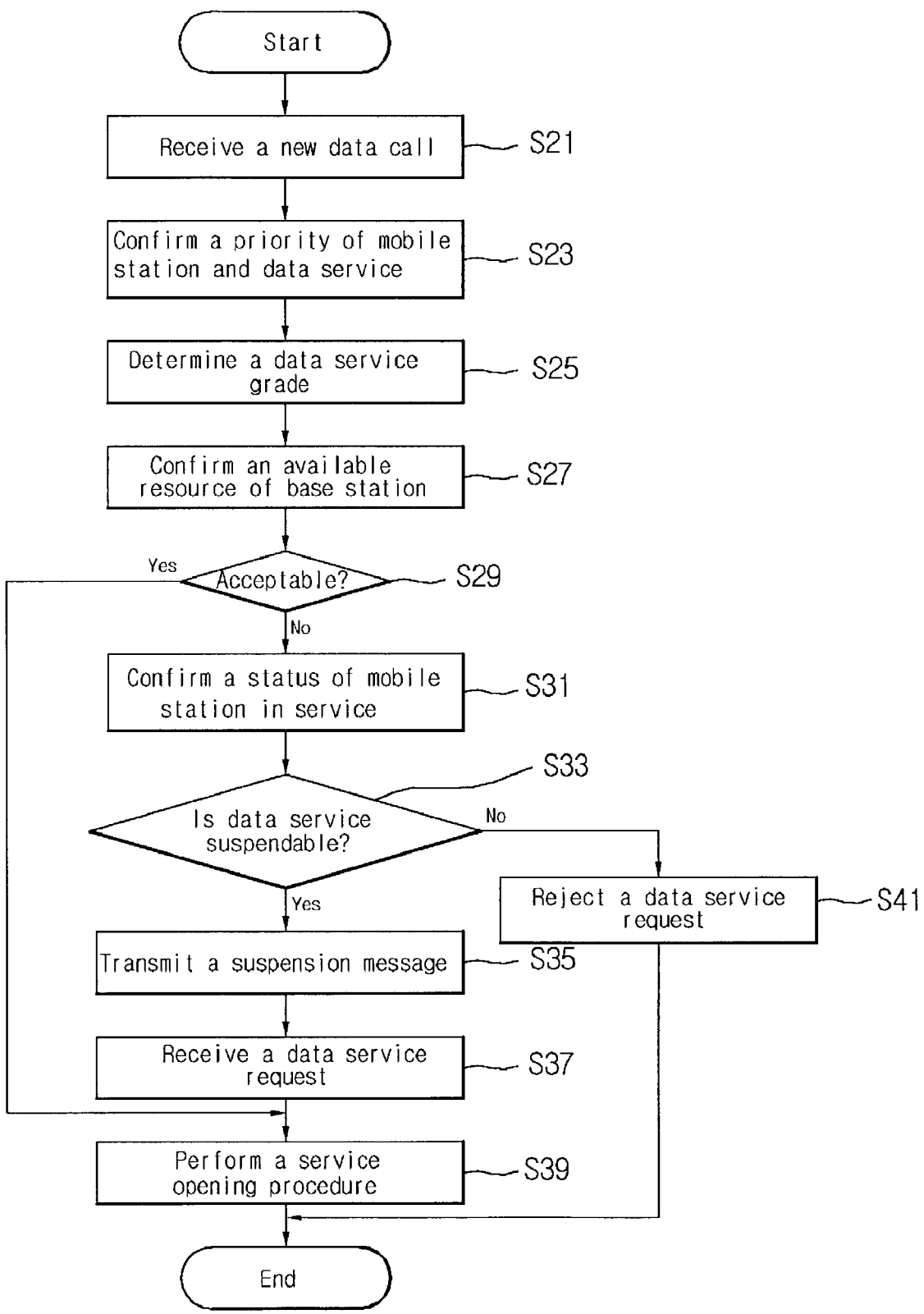
FIG. 2 illustrates a flow chart explaining a method for managing a radio resource in the related art.
Figure 3:
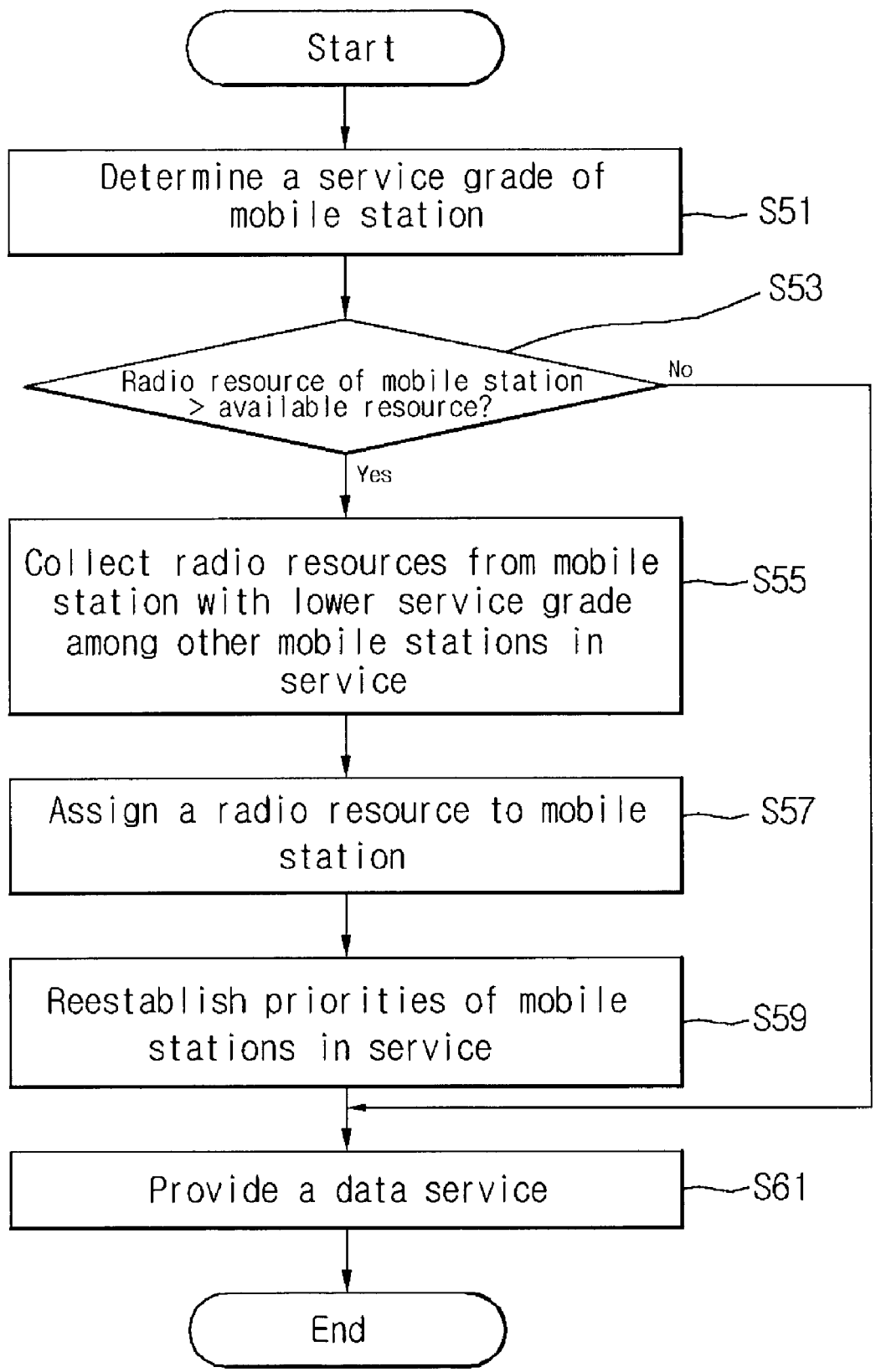
FIG. 3 illustrates a flow chart explaining a method for managing a radio resource in accordance with a preferred embodiment of the present invention.

FIG. 3 is a flow chart explaining a method for managing a radio resource in accordance with a preferred embodiment of the present invention. When a base station receives a data service request from a new mobile station rather than the mobile stations in service, which the base station usually provides data services to, the base station determines a service grade for this new mobile station using the priority of the new mobile station and the priority of the data service requested (S51). In other words, in order to confirm the priority of the new mobile station, the base station finds out whether the new base station should be given a specific service or whether the new base station is usually assigned a high quality of service at a high usage fee. The base station also confirms the priority of the data service requested from the new mobile station. Following the confirmation process, the base station determines the service grade of the new mobile station based on the priority of the mobile station and the priority of the service. If the priority of the mobile station and the priority of the service are designated high, the service grade of the new mobile station can be designated high as well.

Once the service grade of the new mobile station is determined, the base station confirms the radio resource to be assigned to the service grade of the new mobile station and, simultaneously, confirms the presently available resources. And, the base station decides whether the radio resource of the new mobile station can be satisfied by the presently available resource (S53). More specifically, the base station decides whether the new mobile station requires more radio resource than the presently available resource. If the requested radio resource turns out to be more than the presently available resource, the base station refers to a database to confirm the service grade of a mobile station in service. The database has information about the mobile station in service, the service grade thereof, and the radio resources assigned to the mobile station. After referring to the database, the base station collects the assigned radio resources at a constant rate from a mobile station having a lower grade service (S55). Preferably, the mobile station with the lower grade service corresponds to the lowest service grade. Of course, the radio resource assigned to the mobile station having the lowest service grade might be insufficient to satisfy the radio resource requested by the new mobile station. In such case, the radio resource assigned to the mobile station with the next lowest service grade could be collected as well, if necessary.

The constant collection rate mentioned above may be calculated based on the following formula:

$$R(t)=1-[DRC_{low\_QoS}(t)/DRC_{total}(t)]*[QoS_{low\_QoS}(t)/QoS_{total}(t)]$$

wherein $DRC_{low\_QoS}(t)$ is a data transmission rate of the mobile station in service at present that has the lowest service grade, and $QoS_{low\_QoS}(t)$ indicates the quality of service of the mobile station in service at present that has the lowest service grade. In addition, $DRC_{total}(t)$ is the sum of the data transmission rate of the mobile station in service at present, having the lowest service grade (i.e., $DRC_{low\_QoS}(t)$), and the data transmission rate of a mobile station requesting a new data service (i.e., $DRC_{high\_QoS}(t)$). Similarly, $QoS_{total}(t)$ is the sum of the quality of service (QoS) belonging to the mobile station in service at present, having the lowest service grade $QoS(QoS_{low\_QoS}(t))$, and the QoS of the mobile station requesting a new data service (i.e., $QoS_{high\_QoS}(t)$). Here, $DRC_{high\_QoS}(t)$ indicates the data transmission rate of the mobile station requesting a new data service, and $QoS_{high\_QoS}(t)$ indicates the quality of service of the mobile station requesting a new data service.

As may be determined from the formula, to obtain a high collection rate, it is necessary to lower $DRC_{low\_QoS}(t)$ and $QoS_{low\_QoS}(t)$ relative to $DRC_{total}(t)$ and $QoS_{total}(t)$. Also, as mentioned before, since $DRC_{total}(t)$ and $QoS_{total}(t)$ are the sum of $DRC_{low\_QoS}(t)$ and $DRC_{high\_QoS}(t)$ and the sum of $QoS_{low\_QoS}(t)$ and $QoS_{high\_QoS}(t)$, respectively, $DRC_{high\_QoS}(t)$ and $QoS_{high\_QoS}(t)$ should be increased to obtain a high collection rate. Naturally, if $DRC_{high\_QoS}(t)$ and $QoS_{high\_QoS}(t)$ are lowered, a low collection rate is obtained. Accordingly, the four variables, that is, $DRC_{low\_QoS}(t)$, $DRC_{high\_QoS}(t)$, $QoS_{low\_QoS}(t)$, and $QoS_{high\_QoS}(t)$, are important factors for determining an appropriate collection rate.

Determining the collection rate of the radio resource is very advantageous in many ways. First of all, it guarantees stable data service in accordance with the service grades of the mobile stations in service. In addition, relatively more radio resources can be assigned to mobile stations having a good radio environment. As a result, it is possible to manage the available resources of the base station more efficiently and to improve the entire data transmission rate of the base station as well. Here, the radio environment indicates a degree of received power of each mobile station to interference noise, C/I. In short, the resources of the base station can be managed very efficiently by adjusting the collection rate of the radio environment in consideration of the characteristics of the radio environment, such as, whether the characteristics are good or bad.

After the radio resource, which has been assigned to the mobile station corresponding to the lowest service grade, is collected at the constant rate, the base station assigns the collected radio resource to the new mobile station (S57). At this point, the base station can send out a response message to the data service request received from the new mobile station.

Moreover, as the radio resource that has been assigned to the mobile station with the lowest service grade is collected, the base station reassigns the radio resources of other mobile stations in service according to the service grades thereof and determines the priority of the service grades of the mobile stations in service once again (S59). As for reassigning the radio resources to the mobile stations in service, the data transmission rate of the new mobile station and the maximum data transmission rate within a cell in service can be taken into account. In other words, much more radio resources can be reassigned to a mobile station within the cell that requests the maximum transmission rate despite a low service grade thereof. Also, it is always possible to reassign the radio resources to the mobile stations in service based on the priority of each mobile station in service, the data service priority, and so on.

The base station, using the radio resource assigned to the new mobile station, can provide the requested data service and continue providing data services to other mobile stations according to the reestablished priorities (S61).

On the other hand, if there is more available resource at present than the requested radio resource assigned to the new mobile station in step 53, the base station proceeds to step 61 and provides the data service to the new mobile station by assigning the radio resource requested.

In conclusion, according to the method for managing the radio resource in the mobile communication system of the present invention, the radio resource of a mobile station having a low service grade is collected to be assigned to another mobile station having a high service grade, which improves the quality of service as well as manages the radio resources in the base station more efficiently.

In addition, by collecting part of the radio resource of the mobile station having a low service grade, the present invention minimizes the influences of other mobile stations in service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for managing a radio resource in a mobile communication system, comprising:
    determining a service grade of a requesting mobile station that requests a data service;
    collecting a portion of a first radio resource, which is assigned to a mobile station corresponding to a lower service grade among other mobile stations in service, at a constant rate, based on a second radio resource required for the service grade;
    assigning the second radio resource to the requesting mobile station using the collected portion of the first radio resource;
    reassigning radio resources of mobile stations in service based on the collected portion of the first radio resource;
    reestablishing priorities in accordance with service grades of the mobiles stations in service after the reassigning; and
    providing data services to the mobile stations in service in accordance with the reestablished priorities,
    wherein the collected portion of the first radio resource is less than the entire first radio resource.

2. The method of claim 1, wherein the service grade is determined in accordance with a priority of the requesting mobile station.

3. The method of claim 2, wherein the service grade is determined in accordance with a data service priority requested from the requesting mobile station.

4. The method of claim 1, further comprising:
    transmitting a response message to the requesting mobile station, in reply to the data service request; and
    providing the data service based on the assigned second radio resource.

5. The method of claim 1, wherein the radio resources of the mobile stations in service are reassigned based on a data transmission rate of the mobile station that requests the data service.

6. The method of claim 5, wherein the radio resources of the mobile stations in service are reassigned based on a maximum transmission rate within a cell.

7. The method of claim 1, wherein collecting the portion of the first radio resource comprises:
    determining an available resource of a base station;
    deciding whether the available resource of the base station satisfies the second radio resource;
    determining service grades of the other mobile stations, if the available resource is less than the second radio resource; and
    determining a collection rate of the first radio resource, which is assigned to a lowest service grade among other service grades of the other mobile stations.

8. The method of claim 7, wherein the service grades of the other mobile stations are predetermined and stored.

9. The method of claim 7, wherein the collection rate of the first radio resource is determined in accordance with a data transmission rate of a mobile station corresponding to the lowest service grade in service.

10. The method of claim 8, wherein the collection rate of the first radio resource is increased as a data transmission rate of the mobile station corresponding to the lowest service grade is decreased.

11. The method of claim 9, wherein the collection rate of the first radio resource is determined in accordance with a data transmission rate of the mobile station that requests the data service.

12. The method of claim 11, wherein the collection rate of the first radio resource is increased as the data transmission rate of the mobile station that requests the data service is increased.

13. The method of claim 9, wherein the collection rate of the first radio resource is determined in accordance with a quality of service of the mobile station that requests the data service.

14. The method of claim 13, wherein the quality of service of the requesting mobile station is based on a kind of service that the requesting mobile station provides.

15. The method of claim 14, wherein the quality of service of the requesting mobile station is the service grade of the requesting mobile station.

16. The method of claim 13, wherein the collection rate of the first radio resource is increased as the quality of service of the mobile station that requests the data service improves.

17. The method of claim 9, wherein the collection rate of the first radio resource is determined in accordance with a quality of service of the mobile station corresponding to the lowest service grade.

18. The method of claim 17, wherein the collection rate of the first radio resource is increased as the quality of service of the mobile station corresponding to the lowest service grade degrades.

19. The method of claim 1, wherein a collection rate of the first radio resource is determined in accordance with a following mathematical formula:

$$R(t)=1B[DRC_{low\_QoS}(t)/DRC_{total}(t)]*[QoS_{low\_QoS}(t)/QoS_{total}(t)],$$

wherein
    $DRC_{low\_QoS}(t)$ is a data transmission rate of the mobile station corresponding to the lower service grade;
    $QoS_{low\_QoS}(t)$ indicates a quality of service of the mobile station corresponding to the lower service grade;
    $DRC_{total}(t)$ is the sum of the data transmission rate of the mobile station having the lower service grade ($DRC_{low\_QoS}(t)$) and a data transmission rate of the mobile station requesting the data service ($DRC_{high\_QoS}(t)$); and
    $QoS_{total}(t)$ is the sum of the quality of service (QoS) belonging to the mobile station corresponding to the lower service grade and a QoS($QoS_{high\_Qos}(t)$) of the mobile station requesting the data service.

20. A method for providing data services of a mobile communication system, comprising:

collecting a portion of a first radio resource at a constant rate, the first radio resource assigned to a mobile station corresponding to a lower service grade among other mobile stations in service at present, in case a second radio resource of a mobile station requesting a new data service exceeds an available resource;

assigning the second radio resource to the requesting mobile station using the collected portion of the first radio resource;

providing the new data service to the requesting mobile station based on the assigned second radio resource;

reassigning radio resources of the other mobile stations based on the collected portion of the first radio resource;

reestablishing priorities in accordance with service grades of the other mobile stations after the reassigning; and providing data services to the other mobile stations in accordance with the reestablished priorities.

21. The method of claim 20, wherein a collection rate of the first radio resource is determined in accordance with a data transmission rate of the mobile station corresponding to the lower service grade among the other mobile stations, a quality of service of the mobile station corresponding to the lower service grade, a data transmission rate of the requesting mobile station, and a service quality of the requesting mobile station.

22. The method of claim 21, wherein the collection rate of the first radio resource is increased as the data transmission rate of the mobile station corresponding to the lower service grade decreases.

23. The method of claim 22, wherein the collection rate of the first radio resource is increased as the quality of service of the mobile station corresponding to the lower service grade degrades.

24. The method of claim 22, wherein the collection rate of the first radio resource is increased as the data transmission rate of the requesting mobile station increases.

25. The method of claim 22, wherein the collection rate of the first radio resource is increased as the service quality of the requesting mobile station improves.

26. A method of allocating communication resources, comprising:

collecting less than all of a first resource that is allocated to a first communication device, which is assigned a lower service priority than a service priority assigned to a second communication device;

deallocating the collected first resource from the first communication device; and allocating the collected first resource to the second communication device, wherein a collection rate of the first resource is determined in accordance with a data transmission rate of the first communication device, a quality of service of the first communication device, a data transmission rate of the second communication device, and a quality of service of the second communication device.

27. The method of claim 26, further comprising:

(a) collecting less than all of an $i^{th}$ resource that is allocated to an $i^{th}$ communication device, which is assigned a lower service priority than the service priority assigned to the second communication device;

(b) deallocating the collected $i^{th}$ resource from the $i^{th}$ communication device; and (c) allocating the collected $i^{th}$ resource to the second communication device, wherein (a), (b), and (c) are performed for every $i^{th}$ resource needed to satisfy a prescribed condition.

28. The method of claim 27, wherein resources are deallocated from each $i^{th}$ communication device in an order corresponding to the respective service priorities assigned to the communication devices.

* * * * *